(12) United States Patent
Ulliman et al.

(10) Patent No.: US 10,669,001 B2
(45) Date of Patent: Jun. 2, 2020

(54) HYBRID ELECTRICAL AND MECHANICAL PROPULSION AND ENERGY SYSTEM FOR A SHIP

(71) Applicant: American Superconductor Corporation, Ayer, MA (US)

(72) Inventors: John M. Ulliman, McLean, VA (US); Douglas C. Folts, Baraboo, WI (US); Bruce Gamble, Lenox, MA (US); Stephen I. Callis, Brandywine, MD (US)

(*) Notice: Subject to any disclaimer, the term of this patent is extended or adjusted under 35 U.S.C. 154(b) by 0 days.

(21) Appl. No.: 16/209,440

(22) Filed: Dec. 4, 2018

(65) Prior Publication Data
US 2019/0176951 A1 Jun. 13, 2019

Related U.S. Application Data

(60) Provisional application No. 62/597,150, filed on Dec. 11, 2017.

(51) Int. Cl.
*B63H 21/20* (2006.01)
*B63H 21/21* (2006.01)
(Continued)

(52) U.S. Cl.
CPC .............. *B63H 21/20* (2013.01); *B63H 21/17* (2013.01); *B63H 21/21* (2013.01); *B63H 21/22* (2013.01);
(Continued)

(58) Field of Classification Search
CPC ........ B63H 21/00; B63H 21/17; B63H 21/20; B63H 21/21; B63H 23/00; B63H 23/24;
(Continued)

(56) References Cited

U.S. PATENT DOCUMENTS

| 3,742,265 A | 6/1973 | Smith |
| 5,482,919 A | 1/1996 | Joshi |

(Continued)

FOREIGN PATENT DOCUMENTS

| CN | 203608011 U | 5/2014 |
| CN | 204886526 U | 12/2015 |

(Continued)

OTHER PUBLICATIONS

Evans I C: "The Future Is Electric Driving Ahead—The Progress of Electric Propulsion", Motorship, Nexus Media Communications, Swanley, Kent, GB, vol. 84, No. 998, Sep. 1, 2003 (Sep. 1, 2003), p. 28,31,33, XP001209458,ISSN: 0027-2000.

(Continued)

*Primary Examiner* — Lars A Olson
(74) *Attorney, Agent, or Firm* — Verrill; John W. Powell

(57) ABSTRACT

A hybrid electrical and mechanical ship propulsion and electric power system, includes a first mechanical power plant configured to drive a first propeller via a first shaft. There is a second electrical power plant configured to drive a second propeller via a second shaft. The second electrical power plant includes HTS generators and a high temperature superconductor (HTS) motor interconnected to the second shaft. There is a first electrical network to which the HTS motor is connected in order to energize the HTS motor to drive the second propeller via the second shaft.

23 Claims, 11 Drawing Sheets

(51) Int. Cl.
*B63J 3/02* (2006.01)
*B63H 21/17* (2006.01)
*B63H 21/22* (2006.01)
*B63J 3/00* (2006.01)

(52) U.S. Cl.
CPC .......... *B63J 3/02* (2013.01); *B63H 2021/202* (2013.01); *B63H 2021/216* (2013.01); *B63J 2003/002* (2013.01)

(58) Field of Classification Search
CPC . B63H 5/00; B63H 5/08; B63H 21/06; B63H 21/22; B63H 5/07; B63H 1/00; B63H 1/04; B63J 3/00; B63J 3/02
USPC .......................................................... 440/3, 6
See application file for complete search history.

(56) References Cited

U.S. PATENT DOCUMENTS

| | | | |
|---|---|---|---|
| 5,585,772 | A | 12/1996 | Joshi |
| 5,625,548 | A | 4/1997 | Gold |
| 5,684,690 | A | 11/1997 | Levedahl |
| 5,777,420 | A | 7/1998 | Gamble |
| 5,912,607 | A | 6/1999 | Kalsi |
| 5,987,342 | A | 11/1999 | Scudiere |
| 6,140,719 | A | 10/2000 | Kalsi |
| 8,035,246 | B2 | 10/2011 | Winn |
| 8,249,758 | B2 | 8/2012 | Schugart |
| 8,319,390 | B2 | 11/2012 | Snitchler |
| 8,478,374 | B2 | 7/2013 | Maguire |
| 8,517,749 | B2 | 8/2013 | Marshall |
| 8,791,052 | B2 | 7/2014 | Tanner |
| 2004/0104632 | A1 | 6/2004 | Keene et al. |
| 2006/0267427 | A1 | 11/2006 | Matsubara et al. |
| 2007/0077830 | A1* | 4/2007 | Rzadki .................. B63H 23/24 440/6 |
| 2012/0190554 | A1 | 7/2012 | Hartig |
| 2012/0302112 | A1* | 11/2012 | Hartig .................. B63H 23/24 440/6 |
| 2015/0027124 | A1* | 1/2015 | Hartig .................. B63H 23/24 60/702 |

FOREIGN PATENT DOCUMENTS

| | | |
|---|---|---|
| DE | 102010009951 A1 | 9/2011 |
| WO | 2016/052213 A1 | 4/2016 |

OTHER PUBLICATIONS

Hackman T: "Electric Propulsion Systems for Ships. \A New 'Power Plant Concept' Gives a Boost to the Marine Sector", ABB Review, ABB ASEA Brown Boveri, Zurich, CH, No. 3, Jun. 1, 1992 (Jun. 1, 1992), pp. 3-12, XP000304699, ISSN: 1013-3119.

"Combined Propulsion Plant Changes Gear", Motorship, Nexus Media Communications, Swanley, Kent, GB, vol. 75, No. 885, Apr. 1, 1994 (Apr. 1, 1994), p. 12/13 XP000435634, ISSN: 0027-2000.

Litzka H: "Antriebskonzepte Kuenftiger Marineschiffsgenerationen. Dtechnikplanung", Schiff Und Hafen, Seehafen Verlag GMBH, DE, vol. 46, No. 5, May 1, 1994 (May 1, 1994), pp. 30-35, XP000465744, ISSN: 1436-8498.

Provisional Opinion Accompanying the Partial Search Result, dated Dec. 19, 2018 received in international patent application No. PCT/US2018/049903, 8 pages.

International Search Report with Written Opinion, dated Dec. 6, 2018, received in international patent application No. PCT/US2018/038674, 13 pages.

\* cited by examiner

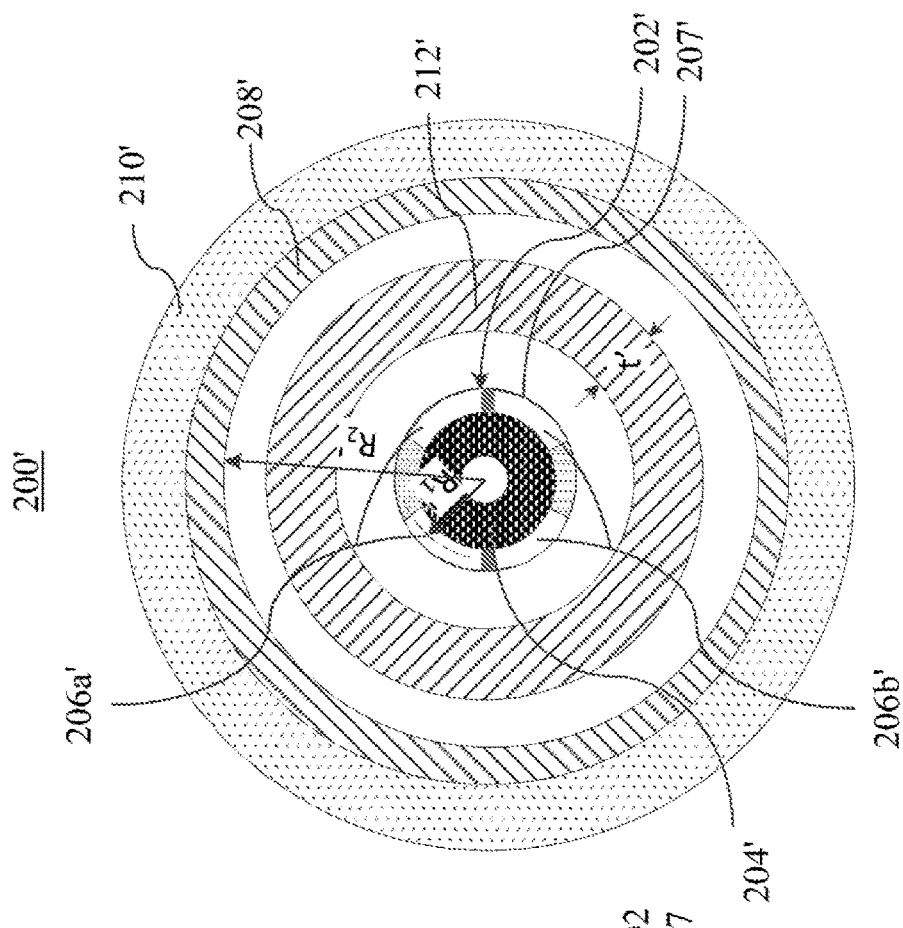
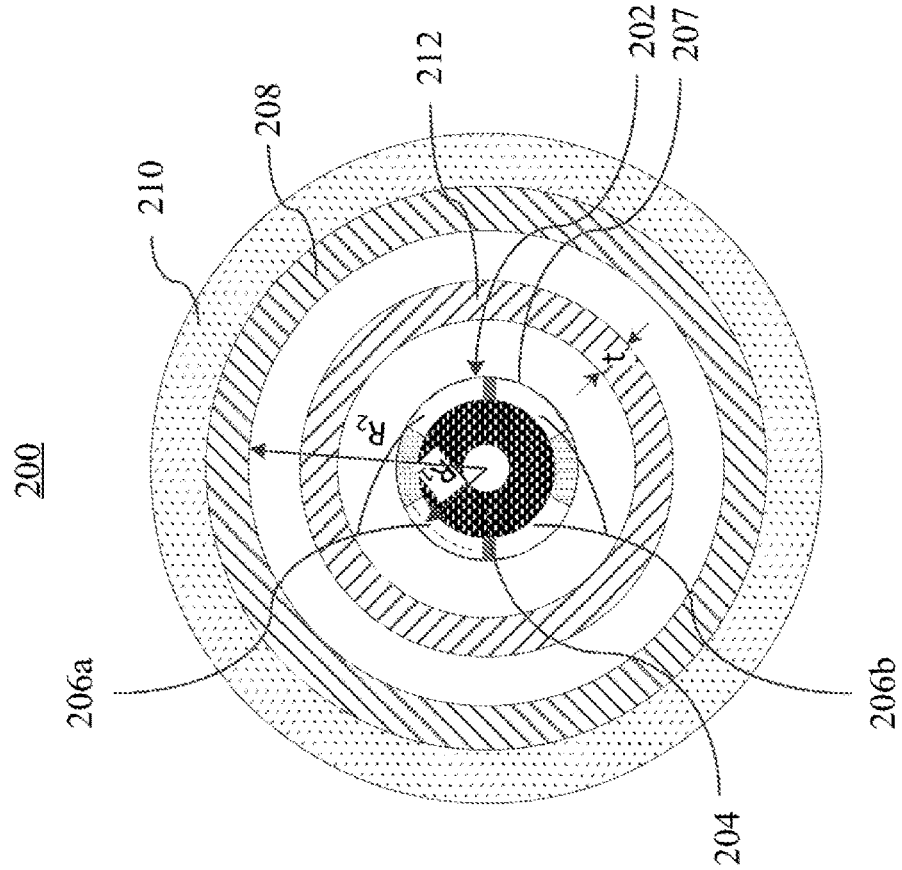
FIG. 5B
FIG. 5A

HYBRID ELECTRICAL AND MECHANICAL PROPULSION AND ENERGY SYSTEM FOR A SHIP

CROSS-REFERENCE TO RELATED APPLICATIONS

This application claims the benefit of priority to U.S. provisional Application No. 62/597,150, filed Dec. 11, 2017, entitled "HYBRID ELECTRICAL AND MECHANICAL PROPULSION AND ENERGY SYSTEM FOR A SHIP", which is related to pending U.S. application Ser. No. 15/697,549, filed Sep. 7, 2017, entitled "HIGH TEMPERATURE SUPERCONDUCTOR GENERATOR WITH INCREASED ROTATIONAL INERTIA", both of which are incorporated herein in their entireties by reference.

FIELD OF THE INVENTION

This invention relates to a hybrid electrical and mechanical propulsion and energy system for a ship, and more specifically to such a hybrid electrical and mechanical propulsion and energy system which utilizes a high temperature superconductor (HTS) motor and HTS generators to exclusively power at least one of the propeller shafts and a mechanical drive to exclusively power at least one other propeller shaft.

BACKGROUND OF THE INVENTION

The shipping industry and navies around the world are interested in upgrading ships using advanced technologies to provide, for example, improved fuel efficiency, greater electric capacity, and more sophisticated onboard systems. Size and weight reductions in propulsion and power generation systems will provide additional room for more equipment, cargo, and/or crew, as well as improved fuel economy. For naval ships, new varieties of electric weapons, advanced sensors, and integrated support systems may be of interest to navies around the world. Such systems may include electromagnetic guns and high-powered laser or microwave directed-energy weapons, which present especially rigorous electrical power demands. For example, they require large amounts of electrical power over very short time periods of time.

Typical ship propulsion and energy generation systems utilize marine gas turbine and diesel engine technologies to drive the ships propeller shafts through a main reduction gear for mobility and separate dedicated electric power generated by prime movers are used to drive electrical generators to power electrical grids which feed the onboard electrical systems. There are physical limits in size and weight reductions that can be achieved with gas turbine technologies and significant advancements are not likely. In addition, marine gas turbine and diesel engine generator technologies, which are used to produce electrical power are typically designed to operate efficiently and reliably at constant loading. Therefore, they are unable to support the above described dynamic loads associated with advanced electrical systems, such as electric weapons, without significant and costly electrical system upgrades which may not even fit on the ship. For example, with a conventional gas turbine generator system an additional energy storage system, such as batteries or a fly wheel, may be needed to eliminate the pulse effects of the primary energy storage powering the electric weapons.

The concept of an all-electric ship, which may include the use of electrical means for all power needs, including propulsion, in lieu of other means such as mechanical, pneumatic, and hydraulic, is gaining momentum. Such all-electric ships, having an integrated power system (IPS), in particular those utilizing high temperature superconductor motors and generators, will result in size and weight reductions, which will provide additional room and weight capacity for more equipment, cargo, weapons, and/or crew, as well as improved efficiency and fuel economy. These systems are envisioned to share electric power seamlessly across a common electric bus allowing for universally shared power for all electric functions of the ship from powering the propellers, to energizing the combat systems, to feeding the lighting loads. However, many current ship designs are such that there is not sufficient space or weight capacity available to support the amount of additional power needed and, even if there were, the power system is not sufficiently developed to manage and smooth out the extreme pulse power distortions that are a byproduct of electric weapons for a "common electric bus" architecture design to operate and survive. Thus, the true all-electric solution is not currently a viable option for many space and weight constrained ships.

Therefore, there exists a need for a cost effective ship propulsion and energy system which is capable of powering new varieties of weapons, advanced sensors, and integrated support systems having rigorous power demands and for such a system which can provide size and weight reductions to deliver more space and improved fuel economy.

SUMMARY OF THE INVENTION

In one aspect, the invention features a hybrid electrical and mechanical ship propulsion and electric power system, including a first mechanical power plant configured to exclusively drive a first propeller via a first shaft and a second electrical power plant configured to exclusively drive a second propeller via a second shaft. The second electrical power plant includes a high temperature superconductor (HTS) motor interconnected to the second shaft. There is a first electrical network to which the HTS motor is connected in order to energize the HTS motor to drive the second propeller via the second shaft.

In other aspects of the invention, one or more of the following features may be included. There may be included at least one electric weapons system interconnected to and powered by the first electrical network. There may further be included a second electrical network configured to power the ship service electric system; wherein the second electrical network is connected to a disconnect switch which is also connected to the first electrical network; the disconnect switch configured to connect and disconnect the first power network and the second power network. The second electrical power plant may include at least one HTS generator connected to the first power network via a first switchgear. The at least one HTS generator may be a high inertia HTS generator. The first mechanical power plant may include at least one gas turbine or diesel engine prime mover interconnected to a main reduction gear, and herein the main reduction gear may be connected to the first shaft to drive the first propeller. There may further be included at least one ship service turbo-generator or diesel generator interconnected to the second electrical power network. There may also be included a second switchgear connecting at least one pulsed power load to the first electrical network. The first mechanical power plant may be configured to be installed in a first engine room of the ship and the second electrical power plant may be configured to be installed in a second engine room on the ship. In the second engine room on the ship, the at least one HTS generator of the second power plant may be included. The HTS motor may be mounted in the second engine room lower in a hull of the ship than the at least one HTS generator. The HTS motor in the second engine room may be mounted lower in the hull of the ship than the main reduction gear in the first engine room. The main reduction gear may be interconnected to the first shaft at a first angle and the HTS motor may be interconnected to the second shaft at a second angle, and wherein the first angle is greater than the second angle.

In other aspects of the invention, one or more of the following features may be included. There may be included a controller configured to operate the ship propulsion and electric power system in at least two modes of operation. In a first mode, the controller may be configured to connect the at least one HTS generator and the at least one pulsed power load to the first electrical network via the first switchgear and the second switchgear, respectively, and wherein the controller may be configured to open the disconnect switch to isolate the first electrical power network from the second electrical power network, thereby enabling the first electrical network to power the HTS motor to drive the second propeller via the second shaft and to simultaneously power the at least one pulsed power load. In the first mode the controller may be further configured to operate the first mechanical power plant to drive the second propeller via the second shaft. In a second mode, the controller may be configured to connect the at least one HTS generator to and disconnect the at least one pulsed power load from the first electrical network via the first switchgear and the second switchgear, respectively, and wherein the controller may be configured to close the disconnect switch to connect the first electrical power network to the second electrical power network, thereby enabling the first electrical network to supply power to the second electrical power network and to simultaneously power the HTS motor to drive the second propeller via the second shaft. In the second mode the controller may be further configured to operate the first mechanical power plant to drive the second propeller via the second shaft. In a third mode, the controller may be configured to disconnect the at least one HTS generator and the at least one pulsed power load from the first electrical network via the first switchgear and the second switchgear, respectively, and wherein the controller may be configured to close the disconnect switch to connect the first electrical power network to the second electrical power network, thereby enabling the second electrical network to supply power to the first electrical power network and to simultaneously power the HTS motor to drive the second propeller via the second shaft. In the third mode the controller may be further configured to terminate operation of the first mechanical power plant and to allow the second propeller via the second shaft to feather.

In another aspect, the invention features a high temperature superconductor (HTS) rotating machine having a longitudinal axis and having a first rotational inertia. The rotating machine includes a cylindrical stator assembly disposed about the longitudinal axis and a cylindrical rotor assembly disposed within the stator assembly and configured to rotate within the stator assembly about the longitudinal axis. The rotor assembly comprises at least one HTS winding assembly which, in operation, generates a magnetic flux linking the stator assembly. There is a cylindrical electromagnetic shield disposed about the at least one HTS winding assembly and the cylindrical electromagnetic shield has a second rotational inertia. There is a cryogenic cooling system for cooling the at least one superconducting winding assembly of the rotor assembly. The second rotational inertia is at least eighty percent (80%) of the first rotational inertia.

In yet other aspects of the invention, one or more of the following features may be included. The at least one HTS winding may comprise N pole pairs, p. The rotating machine may have a radius, R1, from the longitudinal axis to the at least one HTS winding. The cylindrical electromagnetic shield may have a thickness, t, and the thickness t may be greater than 50% of R1/p. The cylindrical electromagnetic shield may comprise metal. The metal may comprise one or more of copper, steel, lead, gold, tungsten, and spent uranium.

An additional aspect the invention features a turbo-generator having a turbine and a shaft interconnected at a first end to the turbine. There is a high temperature superconductor (HTS) rotating machine connected to a second end of the shaft and having a longitudinal axis and a first rotational inertia. The HTS rotating machine includes a cylindrical stator assembly disposed about the longitudinal axis. There is a cylindrical rotor assembly disposed within the stator assembly and configured to rotate within the stator assembly about the longitudinal axis. The rotor assembly includes at least one HTS winding assembly which, in operation, generates a magnetic flux linking the stator assembly. There is a cylindrical electromagnetic shield disposed about the at least one HTS winding assembly. The cylindrical electromagnetic shield has a second rotational inertia. There is a cryogenic cooling system for cooling the at least one superconducting winding assembly of the rotor assembly. The second rotational inertia is at least eighty percent (80%) of the first rotational inertia.

In further aspects of the invention, one or more of the following features may be included.

The at least one HTS winding may comprise N pole pairs, p. The rotating machine may include a radius, R1, from the longitudinal axis to the at least one HTS winding. The cylindrical electromagnetic shield may have a thickness, t, and wherein thickness t may be greater than 50% of R1/p. The cylindrical electromagnetic shield may comprise metal. The metal may comprise one or more of copper, steel, lead, gold, tungsten, and spent uranium.

BRIEF DESCRIPTION OF THE FIGURES

Embodiments of the present disclosure will now be described, by way of example only, with reference to the attached Figures, wherein:

FIG. 5A shows a cross-sectional view of the type of HTS generator of FIG. 4, taken across the width of the generator, to depict the dimensions of the generator including electromagnetic shield thickness and the electromagnetic gap; and FIG. 5B shows a cross-sectional view of an HTS generator with increased rotational inertia according to an aspect of this invention, taken across the width of the generator, to depict the dimensions of the generator, including the electromagnetic shield thickness and the electromagnetic gap.

DETAILED DESCRIPTION OF THE INVENTION

Figure 1:
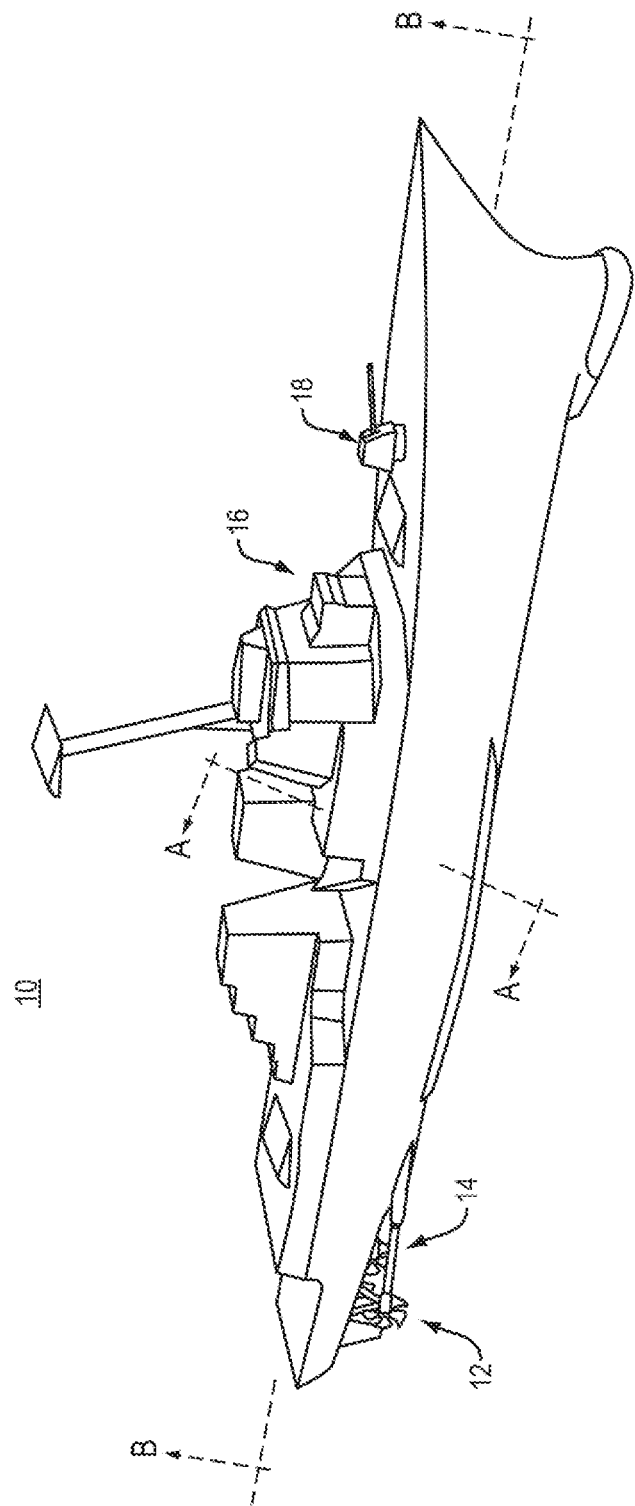
FIG. 1 shows a perspective view of a ship with electric weapons systems and a hybrid electrical and mechanical propulsion and energy system according to an aspect of this disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Referring to FIG. 1, there is shown ship 10, which may be a naval ship, e.g. a destroyer. While the inventive aspects of this disclosure are particularly applicable to naval ships, the invention is not limited to naval ships and could be applied to other types of ships with significant/rigorous power requirements and need for size and weight reductions, such as cruise ships. Ship 10 includes a first all-electric drive 12 and a second all-mechanical drive 14, which together form part of a hybrid electrical and mechanical propulsion and energy system. While in this example, the all-electric drive 12 is the starboard drive and the all-mechanical drive is the port drive, they could be reversed, with the all-electric drive being on the port side of ship 10 and the mechanical drive being on the starboard side of ship 10. Moreover, the invention is not limited to a ship with two drives and could be applied to a greater number of drives, provided there is at least one mechanical drive and at least one electrical drive.

It should be noted that there are examples of ships where one propeller shaft is driven by a combination of a small electric motor (for fuel economy) and then direct mechanical power from a gas turbine. This is all accomplished with a main reduction gear that can accommodate, for example, a 25,000 HP gas turbine rotating at 3,600 RPM and a 2MW electric motor rotating at some other speed. This is also called "Hybrid Electric Drive". A unique feature of the hybrid system described herein is that one shaft is exclusively mechanically driven and the other shaft is exclusively electrically driven.

The hybrid electrical and mechanical propulsion and energy system according to this disclosure may be installed in a newly built ship according to a new ship design or it may be installed as a retrofit to an older/existing ship/design. The retrofit may be of an already built ship wherein a mechanical drive is replaced with an all-electric drive or it may be a retrofit of an existing ship design wherein the ship will be newly built with a hybrid electrical and mechanical propulsion and energy system. In the case of a retrofit design/ship, which is what is being described in the example provided herein, both the port and starboard drives in the original ship configuration would be mechanical drives. Thus, the first mechanical drive would be replaced by all-electric drive 12 and the second mechanical drive 14 would be retained from the original ship design. Also included on ship 10 are certain electric weapons 16 and 18, which may be, for example, electromagnetic guns and high-powered laser or microwave directed-energy weapons that require large amounts of power over very short time periods of time.

As described above, a ship outfitted with existing, marine gas turbine and diesel engine generator technologies, will not be able to support such advanced electrical weapons, since marine gas turbine and diesel engine generators were originally designed to operate efficiently and reliably at constant loading. While an all-electric ship will support electric weapons systems, the power quality requirements for the onboard ship systems are stringent (so-called Type 1 power) and require expensive additional power quality components not fully developed yet, such as series inductance or other energy storage means. This results in many more large system components which are difficult and maybe impossible to find space for in the ship and are high in cost. However, the hybrid electrical and mechanical propulsion and energy system 20, FIG. 2, is capable of powering advanced electric weapon systems and onboard ship systems, as well as providing ship propulsion at an affordable cost and reducing the size, weight and technical complexity, as compared to the original configuration.

Figure 2:
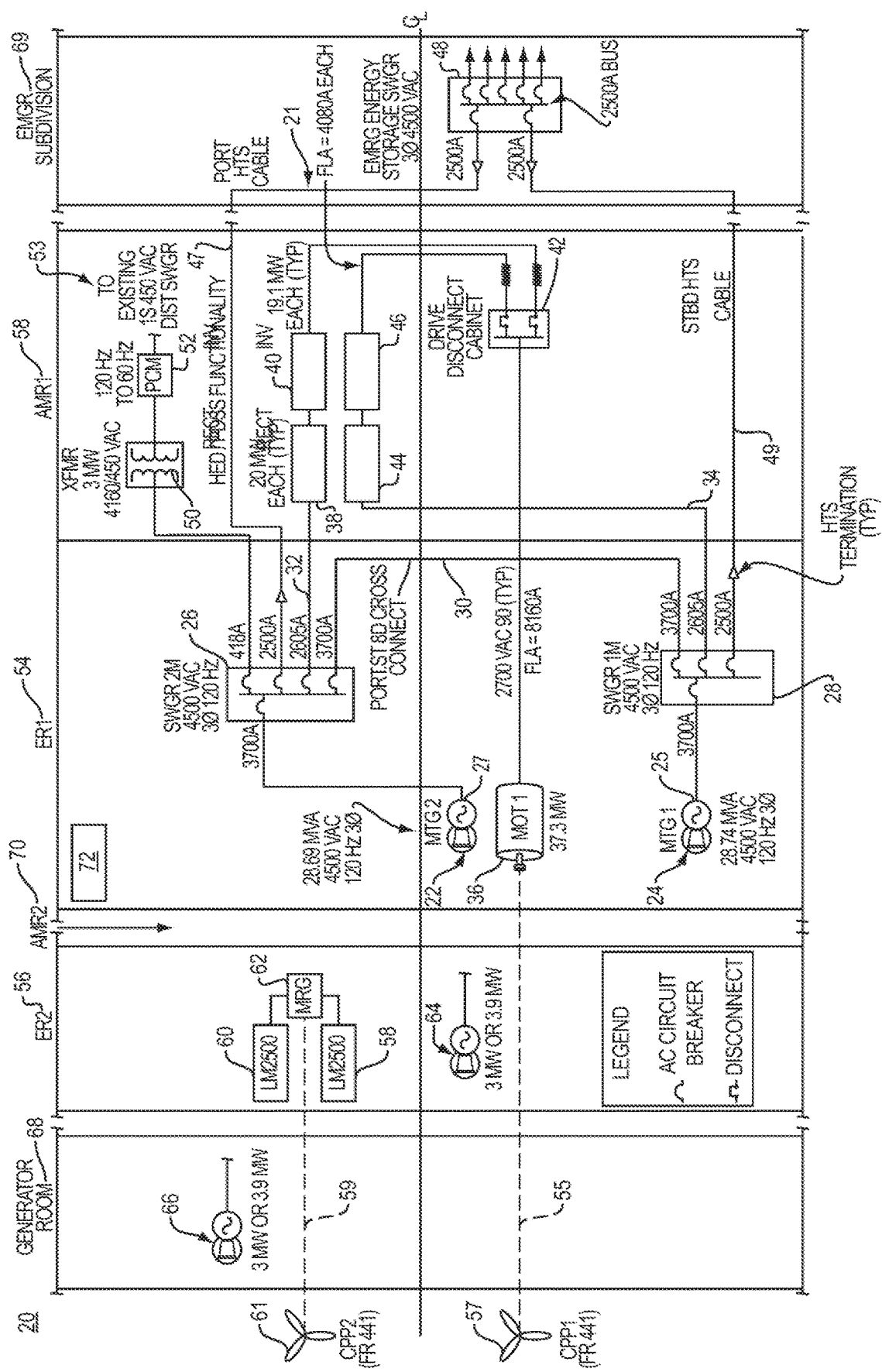
FIG. 2 shows a schematic diagram of the hybrid electrical and mechanical propulsion and energy system of FIG. 1.

As depicted in FIG. 2, hybrid electrical and mechanical propulsion and energy system 20 includes two turbo generators 22 and 24. Each turbo-generator in this example may output 29 MW of three phase power at 4500 V AC (or another suitable voltage level, such as 6 KV) at 60 Hz. As shown, turbo-generator 22 is connected to first power grid 21 through three phase switchgear 26, while turbo-generator 24 is connected to first power grid 21 through three phase switchgear 28. Turbo-generators 22 and 24 have, for example, 29 MW gas turbines (or diesel engine) prime movers which may rotate at high rpm and drive electric generators 25 and 27, respectively. In this example, electric generators 25 and 27 may be, for example, 2 or 4-pole, 3600 rpm HTS generators which each output 29 MW at 60 Hz. However, the disclosure is not limited to any particular generator or gas-turbine power level, pole count, or configuration, and is applicable to various gas turbine systems.

Switchgear 26 is connected to switchgear 28 by port/starboard cable 30 so that in the event of a failure of one of the turbo-generators its respective switchgear can be back fed and powered by the operational turbo-generator. Cables 32 and 34 from switchgear 26 and 28, respectively, supply power to electric propulsion motor 36, which may be a conventional electric motor or a HTS motor. In this example, the voltage level input to variable speed electric motor 36 is nine phase AC at 2700 V; therefore, the power from switchgear 26 and 28 must be converted and conditioned by a suitable motor drive system, described as follows.

The output from switchgear 26 may be connected to rectifier 38 and then the DC may be converted to nine phase AC by inverter 40. Rectifier 38 and inverter 40 form a motor drive for controlling the current input to/rotational speed of motor 36 when they are connected to the motor 36 by disconnect cabinet 42. The output from switchgear 28 may be converted to DC by rectifier 44 and then the DC may be converted to nine phase AC by inverter 46. Rectifier 44 and inverter 46 form a motor drive for controlling the current input to/rotational speed of motor 36 when they are connected to the motor 36 by disconnect cabinet 42. One or both of the motor drives may be connected via the disconnect cabinet 42 to drive motor 36. Thus, first power grid 21 is configured to provide power to HTS motor 36.

First power grid 21 is also configured to supply power to pulsed power loads (i.e. electrical weapons, not shown) via an appropriate energy storage system (not shown) through energy storage switchgear 48. Energy storage switchgear 48 is fed by power cables 47 and 49 which at their other ends are connected to switchgear 26 and 28, respectively. In addition, transformer 50 connected to switchgear 26 may convert 4500V AC from first power grid 21 to 450 V AC and feed that to distribution switchgear (not shown) through a power converter 52 (under certain circumstances) to deliver lower voltage power to a second power grid 53. The detail of the loads on second power grid 53 is not shown, but will be understood by those skilled in the art to include various on-board ship systems, some of which require clean, Type 1 power.

Figure 3:
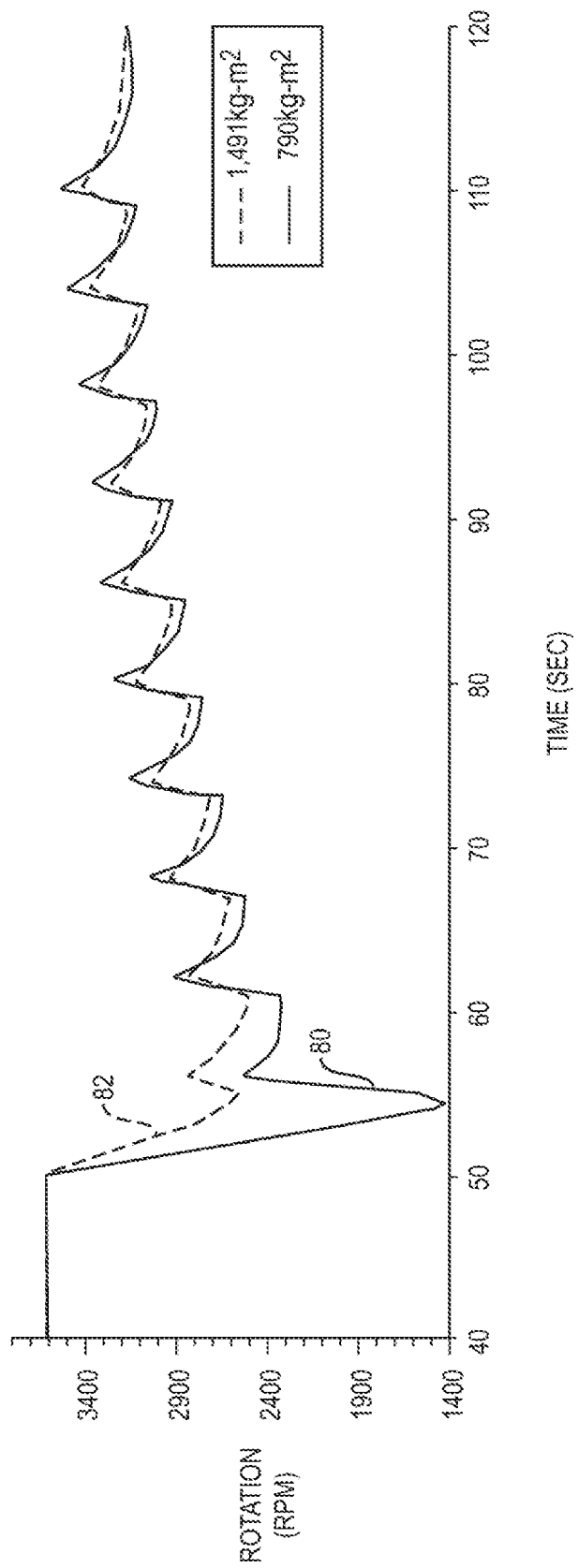
FIG. 3 shows a plot of turbo-generator rotational speed over time to depict the impact of pulsed power loads on generator rotational speed and hence power output.

The pulsed power loads may consist of several seconds (e.g. 5 seconds) of very high power draw (e.g. 10 MW or greater) through the energy storage switchgear 48 followed by a pause (e.g. 1 second) with no energy draw. The system design assumes that this cycle will be repeated indefinitely. As noted above, such pulsed loads can severely impact the proper operation of first power grid 21. The pulsed power loads may cause a drop in rotational speed of the turbo-generators 22 and 24, which results in a proportionate drop in frequency, voltage and power output from the turbo-generators. In FIG. 3, the impact on the rotational speed of such a pulsed load on turbo-generators 22/24 using a typical HTS generator design is depicted over multiple pulse periods (assuming only one of the turbo-generators is operational).

As shown by waveform 80, turbo-generator rpm dips from 3600 to approximately 1400 over the course of a few seconds with the initial pulsed load of 18 MW. The rotational speed of the turbo-generator recovers somewhat over time as the cyclic 18 MW pulses continue, but it still remains substantially below its initial 3600 rpm rotational speed. In this case, the estimated rotational inertia of the generator is approximately 790 kg-m$^2$, which is based on the use of a HTS generator optimized for low cost for a 29 MVA turbo-generator. In this example, the EM shield may be formed of steel and copper with an approximate thickness of 10 cm (4 in). In a weight optimized design, which may use aluminum in the EM shield, the rotational inertia may be significantly lower than in the cost optimized design. This means that the negative impact of the pulsed loads would be even greater.

With relatively low inertia in the turbo-generator, the torque imposed during the pulsed load on the turbo-generator has a more significant impact in reducing the rotational speed. In the example of waveform 80, this translates into a nearly 60% drop in rotational speed and a commensurate drop in voltage, frequency, and power on first power grid 21. Moreover, with this level of cyclic loading on the turbo-generator it is certain to shorten turbine life and it may even cause the engine to shut down.

According to one aspect of this invention, it was realized that with greater rotational inertia in the HTS generator, the impact of the torque on the turbo-generator may be reduced. Thus, the hybrid electrical and mechanical propulsion and energy system according to an aspect of this invention, improves electrical performance under the dynamic loads produced when electric weapons are used. Waveform 82 shows the impact on the rotational speed (approximately a 30% initial drop) of the turbo-generator, with a cyclic pulsed load of 18 MW. In this case, the HTS generator used has an increased rotational inertia resulting in an overall turbo-generator rotational inertia of approximately 1496 kg-m$^2$. The EM shield may be formed of steel with an approximate thickness of 18 cm (7 in). As is evident from waveform 82, as compared to waveform 80, increasing the rotational inertia of the turbo-generator to 1496 kg-m$^2$ reduces substantially the impact of the initial and the subsequent cyclic pulsed loads on the rotational speed of the turbo-generator as well as the impact on voltage, frequency, and power on first power grid 21. Adding a tungsten alloy to the EM shield would further increase the rotational inertia to approximately 1817 kg-m$^2$.

Figure 4:
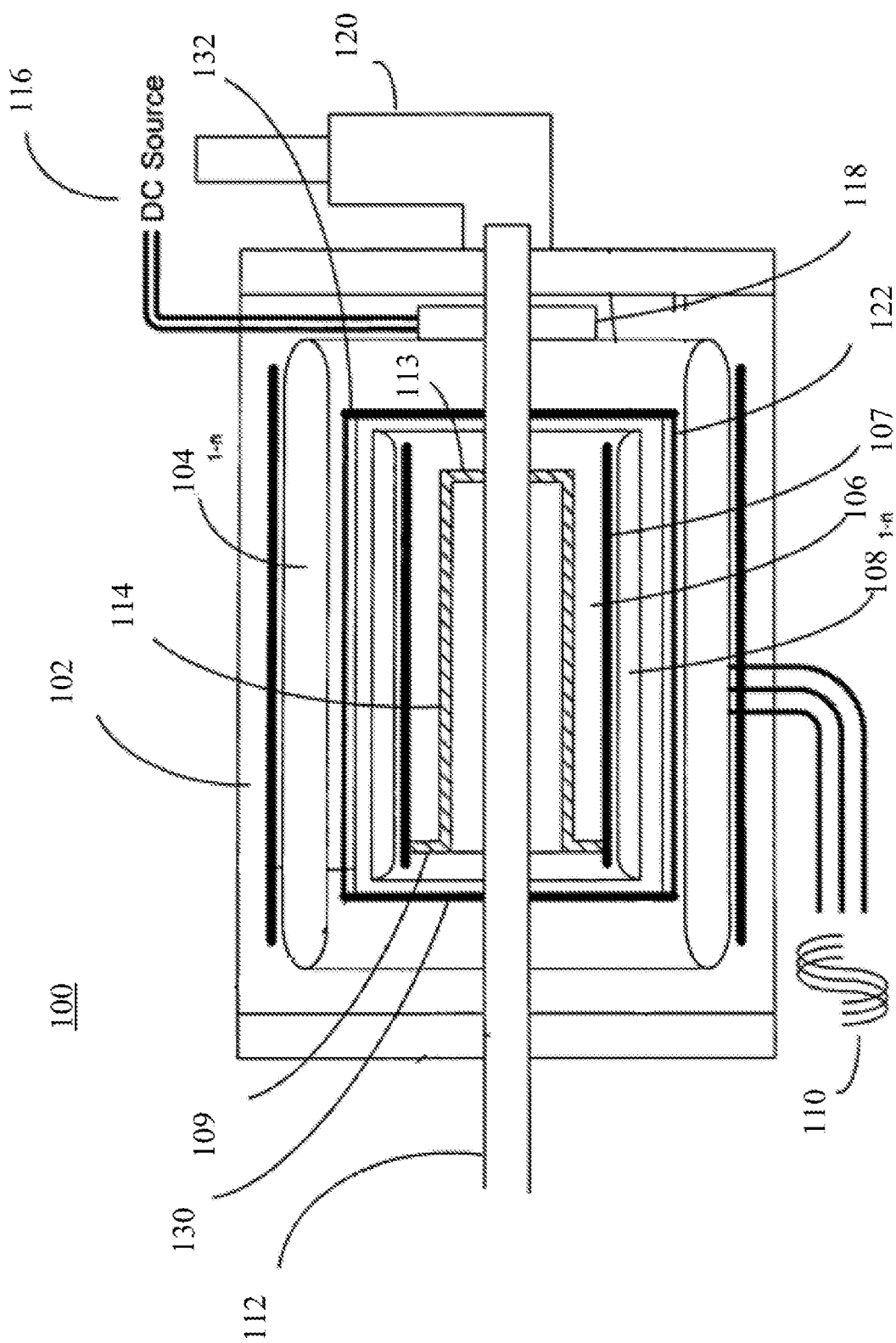
FIG. 4 shows a cross-sectional view of a HTS generator, taken along the length of the generator, designed to be optimized for size and weight reduction.

Referring to FIG. 4, there is shown a prior art HTS generator 100 which has been designed to be optimized for minimum size and weight. As with the lower rotational inertia generator that produced the waveform 80 in FIG. 3, this example may have an rotational inertia such that the overall rotational inertia of the turbo-generator will also be approximately 790 kg-m$^2$. HTS generator 100 includes a stator assembly 102 having stator coil assemblies 104 1-$n$. As is well known in the art, the specific number of stator coil assemblies 104 1-$n$ included within stator assembly 102 varies depending on various design criteria, such as whether the machine is a single phase or a poly-phase machine. For example, in one 29 MVA, 3-phase HTS generator described herein outputting 4500V AC at 60 Hz, stator assembly 102 may include seventy-two (72) stator coil assemblies 14 1-$n$.

A rotor assembly 106 rotates within stator assembly 102. As with stator assembly 102, rotor assembly 106 includes rotor winding assemblies 108 1-$n$. In the same 29 MVA, 3-phase HTS generator, rotor assembly 106 may include two rotor winding assemblies (forming 2 poles), which may be in a saddle coil configuration, as they are well suited to high rpm generator applications. Other rotor configurations, such as a 4-pole configuration, may be used as well. These rotor winding assemblies, during operation, generate a magnetic flux that links rotor assembly 106 and stator assembly 102. While this generator is designed as a two-pole machine, it will be understood by those skilled in the art that various pole count machines could be used and the particular design will be dependent upon the application. During operation of generator 100, a three-phase voltage 110 is generated in stator coil assemblies 104 1-$n$ which, in turn, is output to the power grid of the ship as shown, for example, in FIG. 2. The three-phase voltage in the stator coil assemblies 104 1-$n$, is produced by the rotor winding magnetic flux generated by the rotor coil assemblies 108 1-$n$ that links rotor assembly 106 and stator assembly 102, as the rotor rotates when driven by turbo-generator shaft 112.

The rotor winding assemblies 108 1-$n$ may be mounted on an outside surface of support structure 107, which is connected to a first flange 109 that transfers the torque from torque tube 114. It should be noted that the rotor winding assemblies 108 1-$n$ may, alternatively, be mounted on an inside surface support structure 107. Torque tube 114 is connected to a second flange 113, which is connected to turbo-generator shaft 112. Flanges 109 and 113 may be incorporated into torque tube 114 or may be separate assemblies. Of course, other torque tube designs may be used to transfer the torque from the shaft 112 to the rotor assembly in the cold space.

During operation of superconducting rotating machine 100, field energy 116, for example, from a DC current source (not shown) may be applied to rotor winding assembly 108 1-$n$ through a slip ring/rotating disk assembly 118. Rotor winding assemblies 108 require DC current to generate the magnetic field (and the magnetic flux) required to link the rotor assembly 106 and stator assembly 102. Stator coil assemblies 104 1-$n$ are formed of non-superconducting copper coil assemblies, for example, while rotor winding assemblies 108 1-$n$ are superconducting assemblies incorporating HTS windings. Examples of HTS conductors include: thallium-barium-calcium-copper-oxide; bismuth-strontium-calcium-copper-oxide; mercury-barium-calcium-copper-oxide; and yttrium-barium-copper-oxide.

As these superconducting conductors only achieve their superconducting characteristics when operating at low temperatures, HTS generator 100 includes a refrigeration system 120. Refrigeration system 120 is typically in the form of a cryogenic cooler that maintains the operating temperature of rotor winding assemblies 108 1-$n$ at an operating temperature sufficiently low to enable the conductors to exhibit their superconducting characteristics. Since rotor winding assemblies 108 1-$n$ must be kept cool by refrigeration system 120, torque tube 114 may be constructed from a high strength, low thermal conductivity metallic material (such as Inconel™) or composite material (such as G-10 phenolic or woven-glass epoxy).

Rotor assembly 106 includes an electromagnetic shield 122 positioned between stator assembly 102 and rotor assembly 106 to shield or filter asynchronous fields from harmonics produced in the stator assembly 102. As rotor assembly 106 is typically cylindrical in shape, electromagnetic shield 122 is also typically cylindrical in shape. It is desirable to shield the rotor winding assemblies 108 1-$n$ of rotor assembly 106 from these asynchronous fields. Accordingly, electromagnetic shield 122, which is fitted to rotor assembly 106, covers (or shields) rotor winding assemblies 108 1-$n$ from the asynchronous fields and is constructed of a non-magnetic material (e.g., copper, aluminum, etc.). The electromagnetic shield 122 should be of a length sufficient to fully cover and shield rotor winding assemblies 108 1-$n$. The case considered so far is steel and a thin overcoat of copper with the thicknesses selected to shield ac fields and withstand fault loads. Aluminum is lightest solution but steel could be selected if weight is of less interest than cost. The shield also provides vacuum containment and steel presents a simpler sealing solution with welding.

The electromagnetic shield 122 may be rigidly connected to shaft 112 via a pair of end plates 130, 132. This rigid connection can be in the form of a weld or a mechanical fastener system (e.g., bolts, rivets, splines, keyways, etc.). For shielding, the thickness of electromagnetic shield 122 varies inversely with respect to the frequency of the three-phase AC power 110, which in this example is 60 Hertz. For low pole count designs the thickness may be selected to withstand transient forces during fault. For this frequency, typically, the thickness of electromagnetic shield 122 would be no more than 10 cm (4 in) of steel and copper. In order to reduce the size and weight of the generator, prior art systems such as this one, minimized the thickness of the electromagnetic shield 122 to the point where it was of a sufficient thickness to filter the asynchronous fields and to support fault ovalizing forces on the shield, but no thicker, so as to minimize generator weight and size.

Although not shown in generator 100 of FIG. 4, an inner ferromagnetic core (e.g. an iron core) may be used to increase the magnetic permeance of the rotor and hence may allow for a reduced amount of HTS material needed to generate a given magnetic field. It also adds to the rotational inertia of the generator in a significant way. In FIG. 5A there is shown a schematic cross-sectional view of HTS generator 200, which is similar to the type of HTS generator shown in FIG. 4. The cross-sectional view is taken across the width of the generator, to depict the dimensions of the generator including electromagnetic shield thickness and the electromagnetic gap. In this example, HTS generator 100*a* includes a rotor assembly 202 having an inner iron core 204 depicted as a two pole generator. Rotor windings 206*a* and 206*b* are in the form of saddle coil windings and are each shown with two arc sections, which are joined at the ends to form the saddle coil.

In designing HTS generator 200, the limit on tip speed for HTS saddle coils 206*a/b* must be considered. Centrifugal loading on the HTS coils results in strain in the superconductor material. This strain is proportional to the square of the tip speed of the coils. Experience and analysis indicates that 150 m/sec tip speed is an acceptable limit for such coils. Generators for naval use may require over-speed testing up to 125% of rated speed. For a design speed of 3600 rpm, this corresponds to an over-speed test at 4,500 rpm requiring a field winding with a ~0.32 m radius from the longitudinal axis of the generator to the mid-plane of coils 206*a/b*, which is depicted as R1 in FIG. 5A. The saddle coils are supported on their outside by a coil support cylinder 207.

The nonrotating part of generator 200 begins at radius R2, which extends from the generator longitudinal axis to the inside radius of the stator 208, and consists of stator 208 and back iron 210. Outside of the coil support cylinder 207 is the EM shield 212, which is the outermost rotating member of rotor assembly 202. As described above, it shields the rotor assembly 202 from electromagnetic fields that are asynchronous with respect to the rotation to reduce AC losses in the HTS coil. The field strength produced by saddle coils 206*a/b* is proportional to the ampere-turns in each coil, but is inversely proportional to the electromagnetic ("EM") gap (R2-R1) between the saddle coils and stator. Thus, increasing the EM gap increases the number of ampere-turns and hence the amount of HTS wire needed to generate a given electromagnetic field.

The majority of the EM gap (R2-R1) consists of the EM shield 212 and in a weight or cost optimized design, the EM shield is only made thick enough to perform its shielding function and its weight/mass is minimized by selecting a low density material with shielding capabilities. The EM shield 212 thickness, t, is generally <40% of R1/p, where p is the number of pole pairs in the design (p=1 for a two pole generator). For this design the thickness, t, may be 10 cm (4 in) and the material used for the EM shield may be a moderate-density material such as steel.

To determine the rotational inertia for EM shield 212, the inner radius Ri and outer radius Ro and a mass M would be calculated as follows:

$$M(Ri^2+Ro^2)/2$$

which, in this case, is approximately 560 kg-m². The EM shield rotational inertia relative to the rotational inertia of the other system components in the turbo-generator would be as follows:

| Rotational Inertia - Cost Optimized Design | |
|---|---|
| EM Shield | 560 kg-m² |
| Inner Iron and Shafts | 143 kg-m² |
| Field and support | 87 kg-m² |
| Total Gen. Rotor | 790 kg-m² |
| Turbine | 96 kg-m² |
| Total | 886 kg-m² |

For this example, the rotational inertia of the EM shield relative to the rotational inertia of the total generator is approximately seventy percent (70%). For typical cost/weight optimized designs, the rotational inertia in the EM shield is generally <70% of the overall HTS generator rotational inertia (referred to herein as "low inertia" HTS generators).

An HTS generator with increased rotational inertia is shown in FIG. 5B as HTS generator 200'. All components are essentially the same as HTS generator 200 of FIG. 5A, however, by constructing a thicker EM shield 212' the rotational inertia of the generator can be increased at the expense of additional ampere-turns in saddle coils 206a'/b'. In other words, a greater amount of HTS material will be required to produce the same electromagnetic field in HTS generator 200' as in HTS generator 200, since the EM gap (R2'-R1') of HTS generator 200' is greater than the EM gap (R2-R1), due to the increased thickness of the EM shield 212'.

For the increased rotational inertia design of HTS generator 200', the EM shield 212' thickness, t', may be ≥50% of R1/p. For this design, the thickness, t', may be approximately 18 cm (7 in). In addition to increasing the thickness of the EM shield to increase its rotational inertia, higher density materials could be used. Examples of such materials may include copper (8.96 g/cm3), steel (7.84 g/cm³), lead (11.32 g/cm³), gold (19.282 g/cm³), tungsten (19.25 g/cm³), and spent uranium (18.95 g/cm³). One or more of these materials may be used to construct the EM shield.

By selecting the appropriate thickness and material composition of the EM shield 212', the amount of additional rotational inertia of the EM shield can be tailored to obtain desired operational characteristics for the particular turbo-generator and expected level and frequency of pulsed power loads.

To determine the rotational inertia for EM shield 212', the inner radius Ri' and outer radius Ro' and a mass M' (using a combination of steel and tungsten alloy, for example) would be calculated as follows:

$$M'(Ri'^2+Ro'^2)/2$$

which, in this case, is approximately 1,477 kg-m². The EM shield rotational inertia relative to the rotational inertia of the other system components in the turbo-generator would be as follows:

| Rotational Inertia - Rotational Inertia Optimized Design | |
|---|---|
| EM Shield | 1,477 kg-m² |
| Inner Iron and Shafts | 151 kg-m² |
| Field and support | 92 kg-m² |
| Total Gen. Rotor | 1,720 kg-m² |
| Turbine | 96 kg-m² |
| Total | 1,816 kg-m² |

For this rotational inertia optimized example, the rotational inertia of the EM shield relative to the rotational inertia of the total generator is approximately eighty-five percent (85%). For typical rotational inertia optimized designs, the rotational inertia in the EM shield may be generally ≥80% of the overall HTS generator rotational inertia (referred to herein as "high inertia" HTS generators).

If this design with a thick EM shield were constructed with just stainless steel in the EM shield the generator rotational inertia would still be 1492 kg-m² which is still nearly 190% of the rotational inertia of the cost and weight optimized design. The design of the HTS generator according to this invention has a number of important advantages; namely, it fits within a short axial length, has low reactance that avoids pole slipping in a highly pulsed application, and has high rotational inertia.

Referring again to FIG. 2, the remainder of the hybrid electrical and mechanical propulsion and energy system 20 is described. In this particular ship, there are two main engine rooms, ER1 54 and ER2 56. In ER1 54 there are included turbo-generator 22 connected to three phase switchgear 26 and turbo-generator 24 connected to three phase switchgear 28, as described above. In addition, the electric propulsion motor 36, which in this case is a HTS motor, is also installed in ER1 54. HTS motor 36 is connected to starboard shaft 55, which drives starboard propeller 57. In engine room ER2 56 there are included two gas turbine prime movers or engines 58 and 60 (e.g. LMR2500s), which each have a drive shaft connected to main reduction gear 62. Port shaft 59 is interconnected to main reduction gear 62, which together drive port propeller 61. In the original design, before retrofitting the ship with the hybrid electric and mechanical propulsion and energy system, ER1 54 would have been outfitted with two gas turbine prime movers or engines (e.g. LMR2500s), which each would have a drive shaft connected to main reduction gear to drive shaft 55 and propeller 57.

Two additional small turbo-generators 64 and 66 (on a naval ship referred to as ship service gas turbine generators or "SSGTGs"), each output approximately 3.9 MW of electric power are connected to the second power grid 53 and are included in ER2 56 and generator room 68, respectively. Under normal operating conditions, these turbo-generators are the main source of power for the second power grid 53, which is a 450V distribution power network for the onboard ship systems. In the original ship design, the two small turbo-generators 64 and 66, along with an additional 3.9 MW SSGTG (not show), which would have been incorporated into ER1 54, would together provide sufficient power capabilities to second power grid 53. In the retrofit design depicted in FIG. 2, the third turbo-generator is not needed due to the additional power capabilities provided by turbo-generators 22/24 via first power grid 21.

The remainder of components for first power grid 21 (other than switchgear units 24 and 26, port/starboard cable 30, and energy storage switchgear 48) are included in a first auxiliary machinery room, such as AMR1 58. Of course, these components would need to be added in the retrofit to complete the hybrid electrical and mechanical propulsion and energy system design according to an aspect of this invention. The second auxiliary machinery room, AMR2 70, is not needed for installation of the components in hybrid electrical and mechanical propulsion and energy system 20. It should be noted that the components of the hybrid electrical and mechanical propulsion and energy system described herein may be installed in various locations and arrangements within ship 10 and need not be installed in the rooms and locations described in this example.

The topology described herein provides the required step change increase in electric power to incorporate high pulse load systems like the rail guns and lasers, incorporating most of the benefits of a pure IPS system, but using existing, low risk electrical and control technology available today. This topology and design minimizes the impact to the existing arrangements of ships to make the solution possible today without adding to the overall length of the ship. Specifically, with the example described herein, an increase in power from approximately 12 MW's (3*3.9 MW turbo-generators) to a total of over 60 MW's (2*29 MW HTS generators and 2*3.9 MW turbo-generators) in available electric power without increasing the size (length) of the ship can be achieved.

This system architecture is designed to selectively combine or disconnect ship electric load functions in order to maximize the benefits of sharing electric power on a common bus, similar to a pure IPS system, but with the critical design feature of separating the common bus into two independent ship buses when pulse loads are being generated. Therefore, with a naval ship example, during noncombat ship steaming, the system is configured into a single common bus where power is shared between the ship's propulsion system and all other ship electric loads (except high energy weapons) and then during combat operations a circuit breaker is opened between the ships main electrical bus and the bus serving the high energy weapons and the propulsion in order to protect the ships main electrical bus from the effects of the weapons. By employing a systems level design able to switch from a common bus to two islanded buses serving independent prime movers and loads the majority of the benefits of the true all-electric ship (sharing ships power for flexibility, survivability and mobility fuel saving) are achieved and the ship has the benefits from a significant increase in available electric power to operate both the high energy weapons and simultaneously power the propulsion system, In addition to the above features, ship fuel economy can be dramatically improved. With a common bus used during noncombat operations this allows the electric propulsion motor to be powered from the SSGTG (typically only available for non-propulsion ship electric loads) to providing a reduced ship speed (e.g. ½ speed) in a highly economical mode. This will not only save on the cost of fuel, but also significantly extend the ship's range and time on station.

As noted above, the system is designed to have a split bus arrangement during weapon operations (i.e., isolation between first power grid 21 and second power grid 53) combining the high power pulse weapons and sensor loads together with ship propulsion on a single bus, while at the same time isolating the ship's combat power that requires a clean power bus (i.e. Type 1 power) for the ship's other operating functions. The system is also designed to combine the split bus into a single shared bus (ship propulsion and ship power) during non-combat periods. This adds scalability and flexibility to the mobility and economy of the ship. All of the main gas turbines can be shut down and the ship can operate in a high fuel economy mode by utilizing one of the two ship's service gas turbine generator (SSGTG) units to power the HTS electric propulsion motor for the starboard shaft. Alternatively, the ships two SSGTG's could be shut down and the ship power system grid 53 and main propulsion 36 could be powered by a single turbo-generator 22 or 24. There are many other combinations of the SSGTG's and the turbo-generators that add to ship power flexibility and survivability.

Figure 6A:
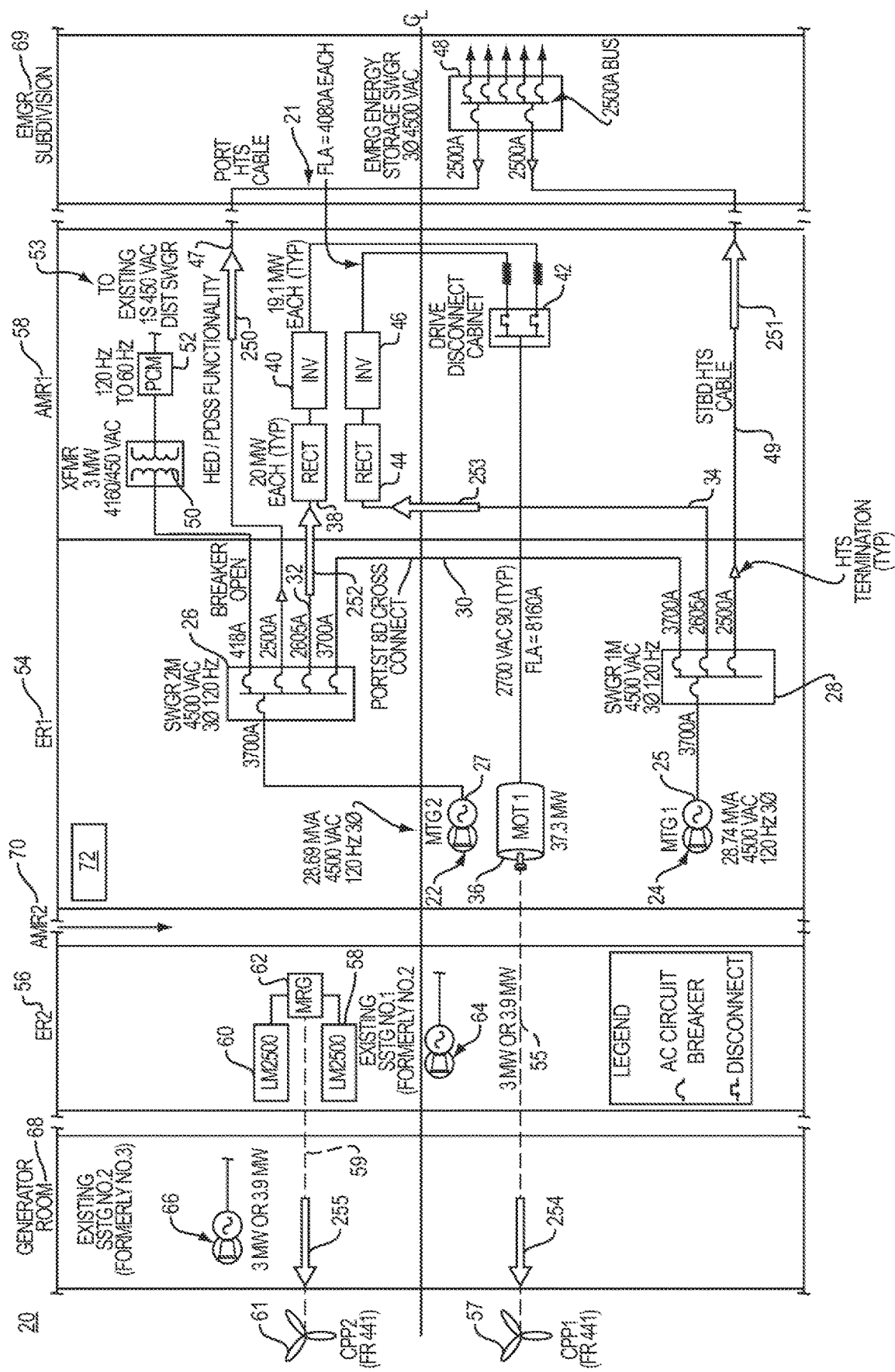
FIG. 6A shows a schematic diagram of the hybrid electrical and mechanical propulsion and energy system of FIG. 2 depicting an active electric weapons mode with activated electric drive.
Figure 6B:
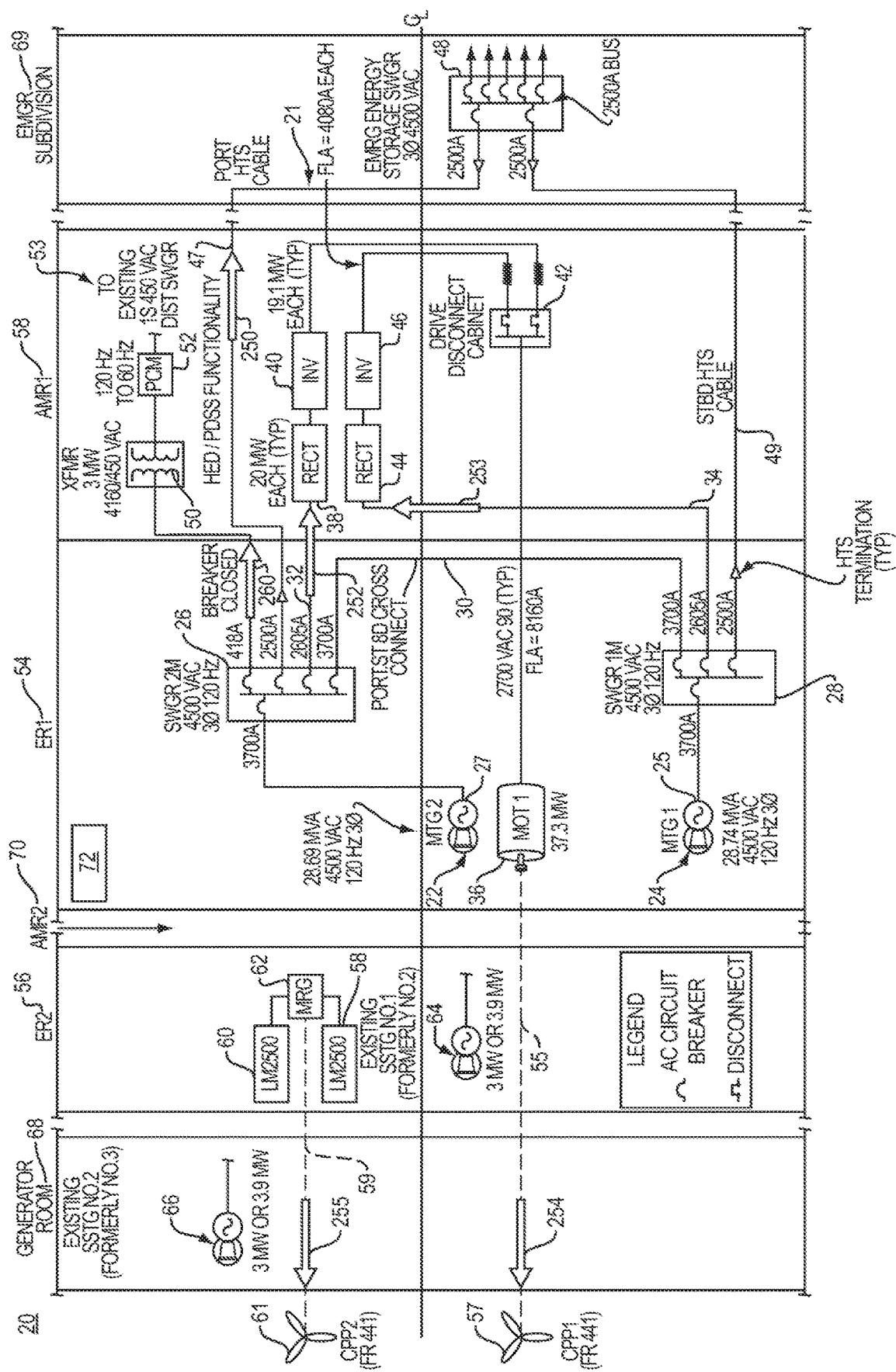
FIG. 6B shows a schematic diagram of the hybrid electrical and mechanical propulsion and energy system of FIG. 2 depicting an inactive electric weapons mode with activated electric drive and ship service electrical systems power.
Figure 6C:
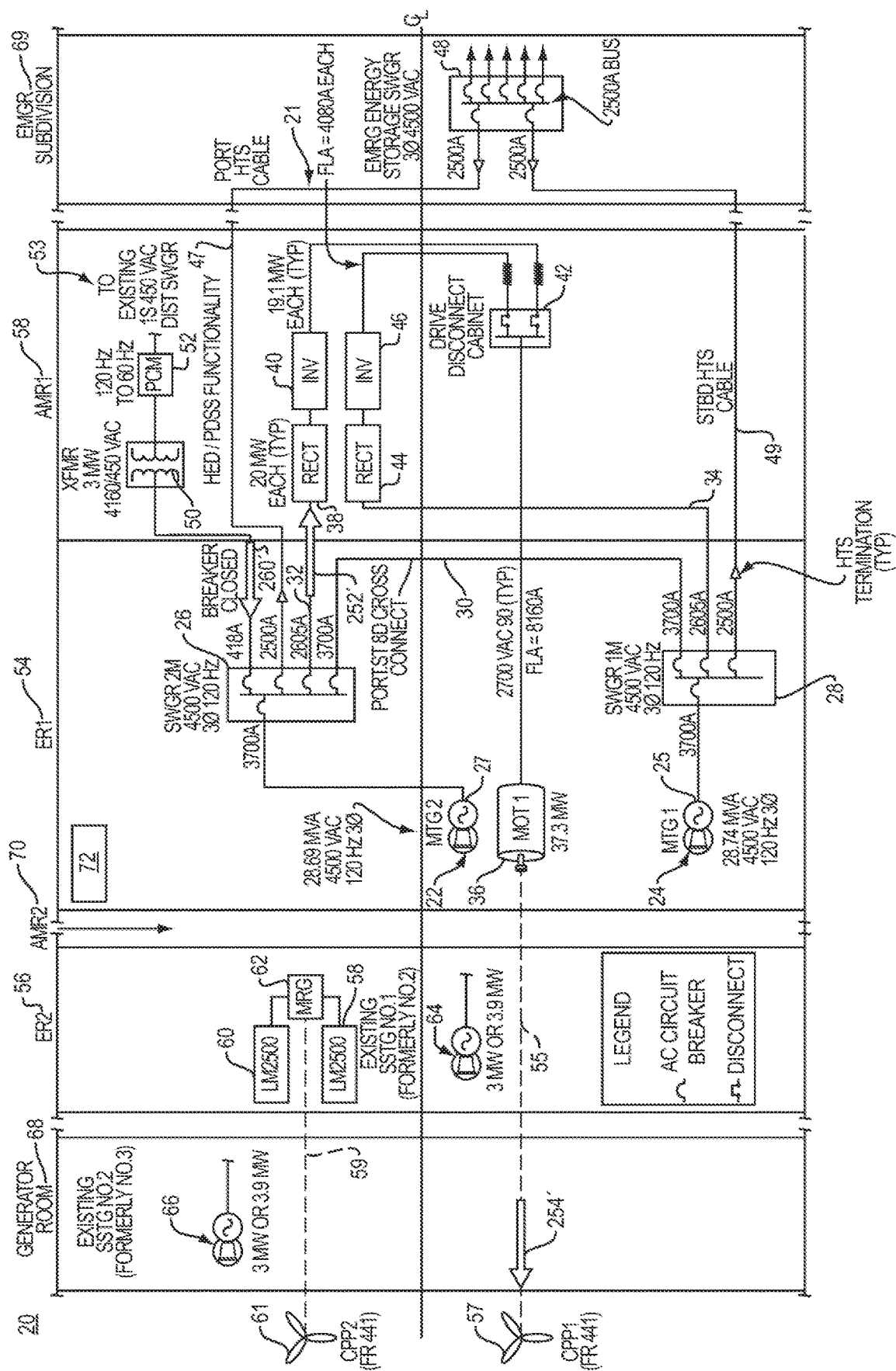
FIG. 6C shows a schematic diagram of the hybrid electrical and mechanical propulsion and energy system of FIG. 2 depicting an economy mode with the electric drive powered by the ship systems power and a deactivated mechanical drive.

The above described modes of operation which the topology of the system architecture of FIG. 2 enables, are described in more detail with regard to FIGS. 6A-6C. As shown in FIGS. 2 and 6A-6C, a system controller, such as a machinery control system (MCS) 72, may be provided to control/operate all power generation, propulsion, and electrical components in ER1 54, ER2 56, AMR1 68, and EMRG 69, as described in the following modes of operation. It will take commands from the ship's bridge and translate that into all load demands from propulsion to powering the rail gun.

A first mode of operation is depicted in FIG. 6A, which shows the hybrid electrical and mechanical propulsion and energy system of FIG. 2 in an active electric weapons mode with activated electric drive. Breaker 50 is placed in an "open" position, thereby isolating the first power grid 21 from the second power grid 53 and causing the first power grid 21 to supply all of the power required by pulsed power loads (i.e. electrical weapons, not shown) via an appropriate energy storage system (not shown) through energy storage switchgear 48. The power flow to energy storage switchgear 48 is indicated by arrows 250 and 251, which power is supplied from switchgear units 26 and 28, respectively. First power grid 21 is also configured to provide all of the power required to drive HTS motor 36, indicated by arrows 252 and 253, which power is also supplied from switchgear units 26 and 28, respectively. With the power levels produced by the turbo-generators 22/24, power grid 21 can deliver sufficient power to the HTS motor 36 such that when combined with mechanical drive (operational in this first mode) they together drive the propellers 57 and 61 (as indicated by arrows 254 and 255, respectively) with sufficient power to propel ship 10 at near its top cruising speed while simultaneously being able to operate the pulsed power loads.

As described above with regard to FIG. 3, the pulsed power loads do disrupt power grid 21, but HTS generators 25 and 27 may be configured with a high inertia HTS generator to limit the disruption caused the pulsed power loads. In addition, since the HTS motor 36 is driven by motor drives comprising rectifiers (38/44) and inverters (40/46), the drives can be configured to sufficiently condition the power before delivery to the HTS motor 36. The level of disruption on first power grid 21 during activation of the pulsed power loads is likely to be too significant to feed the second power grid 53 (which requires Type 1), so the breaker 50 is placed in an "open" position, as indicated above, to isolate first power grid 21 from second power grid 53. In this first mode, the second power grid 53 is powered by turbo-generators 64 and 66.

In a second mode of operation, as depicted in FIG. 6B, the hybrid electrical and mechanical propulsion and energy system is configured in an inactive electric weapons mode with activated electric drive. Breaker 50 is placed in a "closed" position, thereby connecting first power grid 21 to second power grid 53 and causing the first power grid 21 to supply all of the power required by second power grid 53, as indicated by arrow 260. In this mode, turbo-generators 64 and 66 can be de-activated and thus fuel normally required to power the turbo-generators can be saved. Alternatively, power grid 21 can supplement the power to power grid 53 working together with turbo-generators 64 and/or 66 depending upon the power demand from power grid 53. There is no power flow to energy storage switchgear 48 in this mode, as the switch gear is placed in the open position and the pulsed loads are de-activated. In this mode, like the first mode, first power grid 21 is configured to provide all of the power required to drive HTS motor 36, indicated by arrows 252 and 253, which power is also supplied from switchgear units 26 and 28, respectively. With the power levels produced by the turbo-generators 22/24, power grid 21 can deliver sufficient power to the HTS motor 36, such that when combined with mechanical drive (operational in this second mode) they are able to drive the propellers 57 and 61 (as indicated by arrows 254 and 255, respectively) with sufficient power to propel ship 10 at its top cruising speed, while simultaneously being able to solely power or add power to the second power grid 53, depending upon the power demand.

And, in a third mode of operation, as depicted in FIG. 6C, the hybrid electrical and mechanical propulsion and energy system of FIG. 2 is configured to operate in an economy mode with the electric drive powered by the ship systems power from second electric grid 53 and with a deactivated mechanical drive. Breaker 50 is placed in a "closed" position, thereby connecting the first power grid 21 to the second power grid 53. In this mode, however, power from the second power grid 53 flows to the first power grid 21, as indicated by arrow 260'. In this mode, one or both of the turbo-generators 64 or 66 is/are activated to provide power to both first and second power grids depending upon load requirements and desired ship speed, 21 and 53, respectively. Turbo-generators 22 and 24 are deactivated and the breakers on switchgear units 26 and 28 are opened. Power from second power grid 53, as indicated by arrow 260', flows through switch gear 26 to rectifier 38 and inverter 40, as indicated by arrow 252, to power HTS motor 36. HTS motor 36 drives the propeller 57 as indicated by arrow 254'. In this mode, gas turbines 58 and 60 are de-activated and propeller 61 is allowed to feather. Thus, ship 10 is propelled by HTS motor 36 alone operating at a reduced power level to propel the ship at approximately ½ speed.

Figure 7:
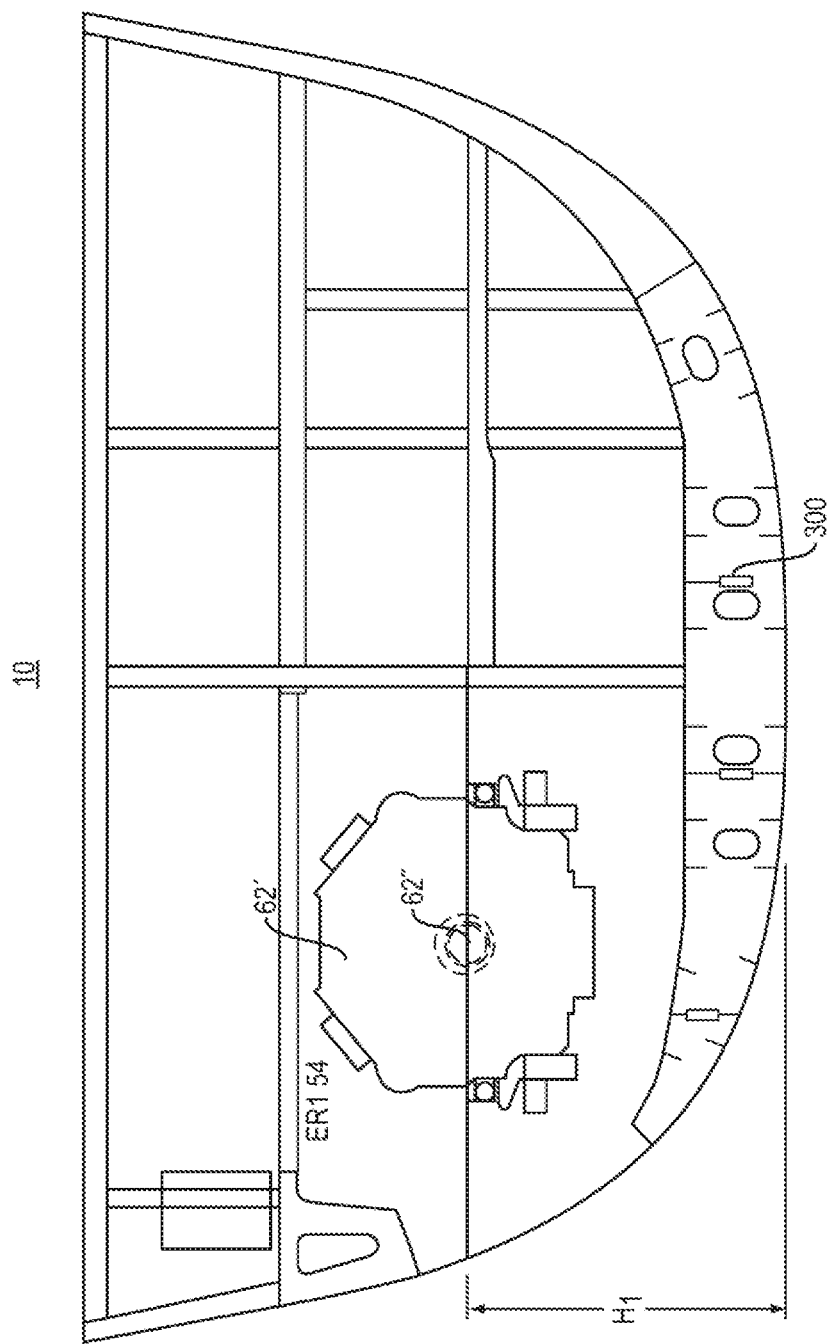
FIG. 7 shows a cross-sectional view of the ship of FIG. 1 taken across the ship along lines A-A and from the forward end of the ship depicting engine room 1 (ER1) before a retrofit according to this disclosure.

In FIG. 7, a cross-sectional view of ship 10 of FIG. 1 taken across the ship along lines A-A and from the forward end of the ship depicts engine room 1 (ER1) before a retrofit according to this disclosure. Thus, a main reduction gear 62' is shown in ER1 54, like the main reduction gear 62 shown in ER2 56. Due to the size of the reduction gear and the required interconnection to the gas turbines 58 and 60 (shown in FIG. 2) the main reduction gear 62' is mounted in ER1 54 at a height $H_1$ from the hull 300. The shaft (i.e. shaft 55, FIG. 2) interconnects to main reduction gear 62' at point 62", which is the point at which the height $H_1$ is measured.

Figure 8:
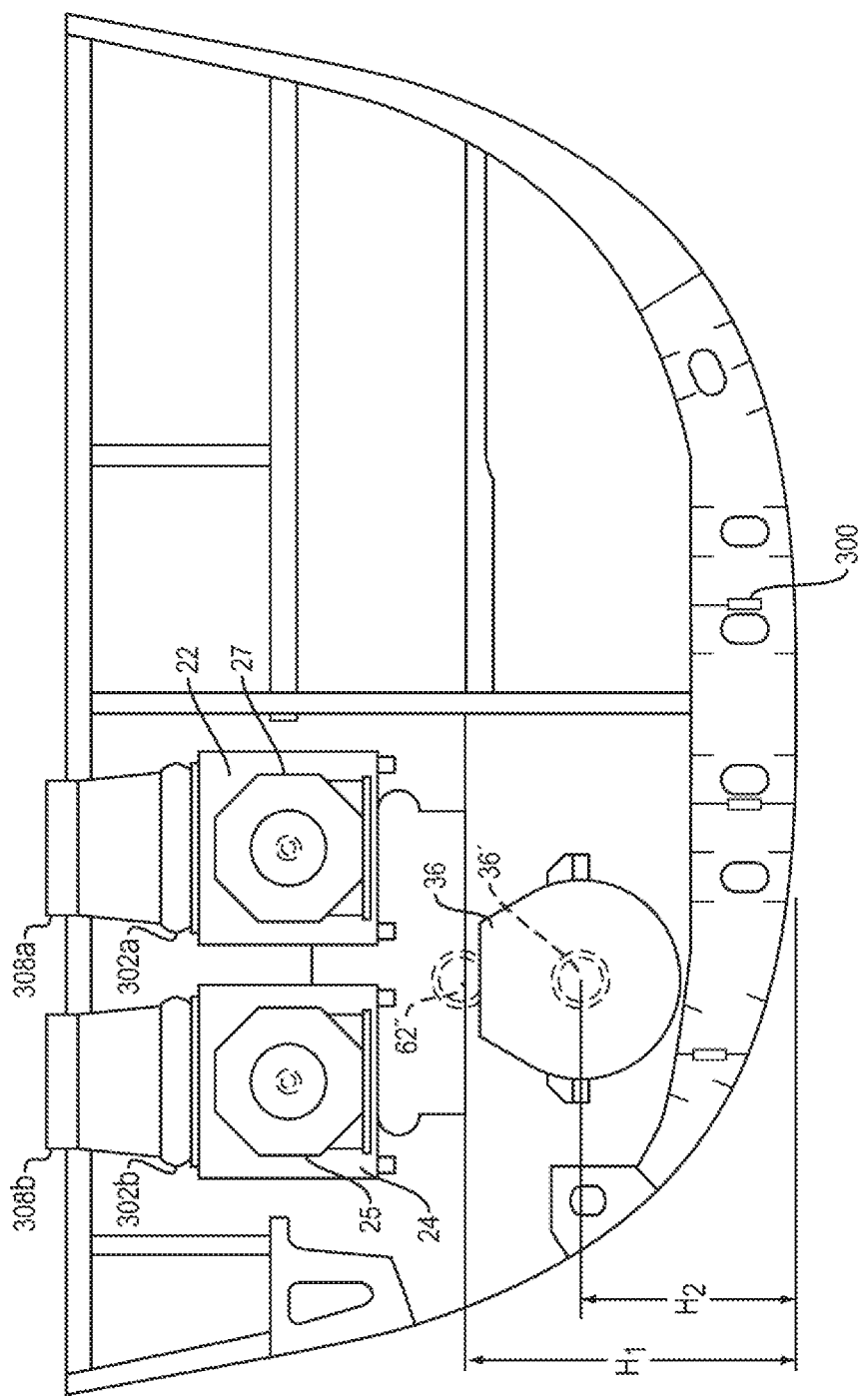
FIG. 8 shows a cross-sectional view of the ship of FIG. 1 taken across the ship along lines A-A and from the forward end of the ship depicting engine room 1 (ER1) after a retrofit according to this disclosure.
Figure 9:
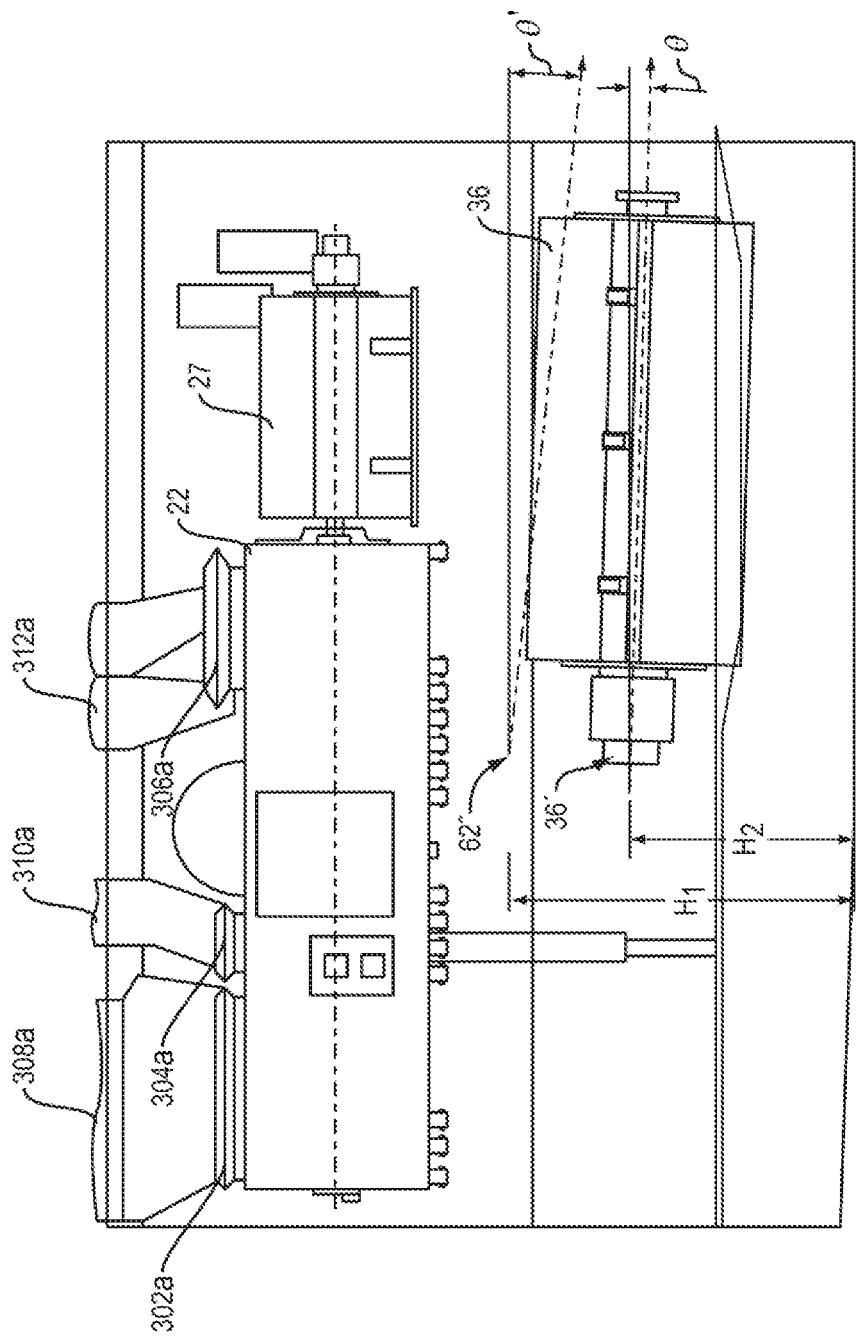
FIG. 9 shows a longitudinal cross-sectional view of the ship of FIG. 1 taken along lines B-B depicting engine room 1 (ER1) after a retrofit according to this disclosure.

Referring to FIGS. 8 and 9, ER1 54 is shown after a retrofit according to this disclosure when the mechanical drive is replaced with two turbo-generators 22 and 24 and an HTS motor 36. Turbo-generators 22 and 24 may be raised toward the top of ER1 54 to maintain the existing inlet and exhaust duct connection points (302a/302b, 304a/304b, 306a/306b on turbines 22 and 24; and 308a/308b, 310a/310b, 312a/3312b on ship). Given the relatively compact size of HTS motor 36 it can be mounted below turbines 22 and 24 at a height $H_2$ measured to point 36', which is the point at which the shaft (i.e. shaft 55, FIG. 2) interconnects to HTS motor 36. Shown in phantom in this view is connection point 62" of the previously installed main reduction gear 62' to illustrate the height difference between $H_1$ and $H_2$. As is more readily apparent in FIG. 9, since $H_1$ is greater than $H_2$ the angle, θ', of shaft 55 connecting propeller 57 to main reduction gear 62' would be greater than the angle, θ, of shaft 55 connecting propeller 57 HTS motor 36. This angle is referred to as the rake angle and when reduced (in this example from approximately 5 degrees to 2 degrees) it will further improve the fuel economy of the ship.

To summarize, the following features of the hybrid electrical and mechanical propulsion and energy system according to this disclosure are provided:

Repurposes ER #1 & AMR #1 to provide 58 MW's of new installed electric power on an existing ship hull that can be used simultaneously to power the ship to full speed and also provide 16 MW's of electric power for weapons.

Adds 58 MW's of installed electric power to the ship without adding to the ships length The system is designed to have a split bus arrangement during weapon operations (combining the pulse power weapon loads together with ship propulsion on a single bus but isolate the ship's combat power that requires a clean power bus) and isolate clean Type I power for the ship's other operating functions.

The system is also designed to combine the split bus into a single shared bus (ship propulsion+ship power) during non-combat periods.

Adds new flexibility to mobility and economy of the ship. All of the main gas turbines can be shut down and the ship can operate in a high fuel economy mode by utilizing one of the two ship's SSTGTG units to power the STBD HTS electric propulsion motor Adds flexibility and survivability to ships electric system. Instead of (3) 3.9 MW SSGTG's to power ships main electric bus there are now four separate power generation sources (2) 3.9 MW SSGTG's and (2) 28.7 MW MTG's able to power that bus.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

We claim:

1. A hybrid electrical and mechanical ship propulsion and electric power system located in a hull of a ship, comprising:
   a first mechanical power plant configured to exclusively drive a first propeller via a first shaft, the first mechanical power plant connected to the first shaft through a main reduction gear;
   a second electrical power plant configured to exclusively drive a second propeller via a second shaft; wherein the second electrical power plant includes a high temperature superconductor (HTS) motor interconnected to the second shaft; and
   a first electrical network to which the HTS motor is connected in order to energize the HTS motor to drive the second propeller via the second shaft;

wherein the HTS motor is mounted lower in the hull of the ship than the main reduction gear; and wherein the main reduction gear is interconnected to the first shaft at a first angle and the HTS motor is interconnected to the second shaft at a second angle, and wherein the first angle is greater than the second angle.

2. The ship propulsion and electric power system of claim 1 further including at least one electric weapons system interconnected to and powered by the first electrical network.

3. The ship propulsion and electric power system of claim 2 further including a second electrical network configured to power the ship service electric system; wherein the second electrical network is connected to a disconnect switch which is also connected to the first electrical network; the disconnect switch configured to connect and disconnect the first power network and the second power network.

4. The ship propulsion and electric power system of claim 3 wherein the second electrical power plant includes at least one HTS generator connected to the first power network via a first switchgear.

5. The ship propulsion and electric power system of claim 4 wherein the first mechanical power plant includes at least one gas turbine or diesel engine prime mover interconnected to a main reduction gear, and wherein the main reduction gear is connected to the first shaft to drive the first propeller.

6. The ship propulsion and electric power system of claim 5 further including at least one ship service turbo-generator or diesel generator interconnected to the second electrical power network.

7. The ship propulsion and electric power system of claim 6 further including a second switchgear connecting at least one pulsed power load to the first electrical network.

8. The ship propulsion and electric power system of claim 7 wherein the first mechanical power plant is configured to be installed in a first engine room of the ship and the second electrical power plant is configured to be installed in a second engine room on the ship.

9. The ship propulsion and electric power system of claim 8 wherein in the second engine room on the ship there is included the at least one HTS generator of the second power plant.

10. The ship propulsion and electric power system of claim 9 wherein the HTS motor is mounted in the second engine room lower in a hull of the ship than the at least one HTS generator.

11. The ship propulsion and electric power system of claim 10 further including a controller configured to operate the ship propulsion and electric power system in at least two modes of operation.

12. The ship propulsion and electric power system of claim 11 wherein, in a first mode, the controller is configured to connect the at least one HTS generator and the at least one pulsed power load to the first electrical network via the first switchgear and the second switchgear, respectively, and wherein the controller is configured to open the disconnect switch to isolate the first electrical power network from the second electrical power network, thereby enabling the first electrical network to power the HTS motor to drive the second propeller via the second shaft and to simultaneously power the at least one pulsed power load.

13. The ship propulsion and electric power system of claim 12 wherein in the first mode the controller is further configured to operate the first mechanical power plant to drive the second propeller via the second shaft.

14. The ship propulsion and electric power system of claim 11 wherein, in a second mode, the controller is configured to connect the at least one HTS generator to and disconnect the at least one pulsed power load from the first electrical network via the first switchgear and the second switchgear, respectively, and wherein the controller is configured to close the disconnect switch to connect the first electrical power network to the second electrical power network, thereby enabling the first electrical network to supply power to the second electrical power network and to simultaneously power the HTS motor to drive the second propeller via the second shaft.

15. The ship propulsion and electric power system of claim 14 wherein in the second mode the controller is further configured to operate the first mechanical power plant to drive the second propeller via the second shaft.

16. The ship propulsion and electric power system of claim 11 wherein, in a third mode, the controller is configured to disconnect the at least one HTS generator and the at least one pulsed power load from the first electrical network via the first switchgear and the second switchgear, respectively, and wherein the controller is configured to close the disconnect switch to connect the first electrical power network to the second electrical power network, thereby enabling the second electrical network to supply power to the first electrical power network and to simultaneously power the HTS motor to drive the second propeller via the second shaft.

17. The ship propulsion and electric power system of claim 16 wherein in the third mode the controller is further configured to terminate operation of the first mechanical power plant and to allow the second propeller via the second shaft to feather.

18. The ship propulsion and electric power system of claim 4 wherein the HTS generator has a longitudinal axis and a first rotational inertia and includes:
   a cylindrical stator assembly disposed about the longitudinal axis;
   a cylindrical rotor assembly disposed within the stator assembly and configured to rotate within the stator assembly about the longitudinal axis, the rotor assembly comprising:
     at least one HTS winding assembly which, in operation, generates a magnetic flux linking the stator assembly; and
     a cylindrical electromagnetic shield disposed about the at least one HTS winding assembly, wherein the cylindrical electromagnetic shield has a second rotational inertia; and
     a cryogenic cooling system for cooling the at least one superconducting winding assembly of the rotor assembly;
   wherein the second rotational inertia is at least eighty percent (80%) of the first rotational inertia.

19. The ship propulsion and electric power system of claim 18 wherein the at least one HTS winding comprises N pole pairs, p.

20. The ship propulsion and electric power system of claim 19 includes a radius, R1, from the longitudinal axis to the at least one HTS winding.

21. The ship propulsion and electric power system of claim 20 wherein the cylindrical electromagnetic shield has a thickness, t, and wherein thickness t>50% of R1/p.

22. The ship propulsion and electric power system of claim 21 wherein the cylindrical electromagnetic shield comprises metal.

23. The ship propulsion and electric power system of claim 22 wherein the metal may comprise one or more of copper, steel, lead, gold, tungsten, and spent uranium.

\* \* \* \* \*